US012790893B2

(12) United States Patent
Whitaker

(10) Patent No.: US 12,790,893 B2
(45) Date of Patent: Nov. 10, 2026

(54) VEHICLE GATE MECHANICAL IMPROVEMENTS

(71) Applicant: Dustin Whitaker, Childress, TX (US)

(72) Inventor: Dustin Whitaker, Childress, TX (US)

( * ) Notice: Subject to any disclaimer, the term of this patent is extended or adjusted under 35 U.S.C. 154(b) by 0 days.

(21) Appl. No.: 19/306,952

(22) Filed: Aug. 21, 2025

(65) Prior Publication Data

US 2026/0055654 A1 Feb. 26, 2026

Related U.S. Application Data

(60) Provisional application No. 63/685,377, filed on Aug. 21, 2024.

(51) Int. Cl.
*E06B 11/02* (2006.01)
*E05F 15/614* (2015.01)
*E05F 15/73* (2015.01)

(52) U.S. Cl.
CPC .......... *E06B 11/022* (2013.01); *E05F 15/614* (2015.01); *E05F 15/73* (2015.01); *E05F 2015/767* (2015.01); *E05Y 2900/402* (2013.01)

(58) Field of Classification Search
None
See application file for complete search history.

(56) References Cited

U.S. PATENT DOCUMENTS 2,561,623 A * 7/1951 Hall ...................... E05F 15/614 49/337
3,988,860 A * 11/1976 Nevarez ................ E05F 15/627 49/327
4,472,908 A * 9/1984 Wanzl ................... E05F 15/614 49/141
5,101,595 A * 4/1992 Rhoades ............... E05F 15/614 49/335
5,123,204 A * 6/1992 He ........................ E05F 15/614 49/139
7,367,161 B1 * 5/2008 Jones .................... E05F 15/614 49/334
7,513,078 B2 * 4/2009 Ho ........................ E05F 15/614 49/140

(Continued)

FOREIGN PATENT DOCUMENTS

EP 2966251 A1 * 1/2016 ............ E05F 15/627
EP 4065803 B1 * 2/2024 .............. E05F 15/40
EP 4400683 A1 * 7/2024 .............. E06B 11/02

(Continued)

*Primary Examiner* — Catherine A Kelly
(74) *Attorney, Agent, or Firm* — Shannon Warren

(57) ABSTRACT

An automatic gate system comprising a support post positioned near an entryway. A motor assembly mounted to the support post. A gate rotating shaft mechanically coupled to the motor assembly. A gate, operatively connected to the gate rotating shaft. Wherein motor assembly is configured to drive the gate rotating shaft, enabling the gate to move bidirectionally between an open and a closed position relative to the entryway. A gear assembly operatively connected to the motor assembly and the gate rotating shaft. Wherein the gear assembly is configured to translate the rotational power of the motor assembly to the gate rotating shaft, thereby enabling the bidirectional movement of the gate. The automatic gate system is configured to selectively rotate the gate bidirectionally.

20 Claims, 9 Drawing Sheets

(56) References Cited

U.S. PATENT DOCUMENTS

| | | | | |
|---|---|---|---|---|
| 2008/0307709 | A1* | 12/2008 | Stull | E05D 15/54<br>49/358 |

FOREIGN PATENT DOCUMENTS

| | | | | |
|---|---|---|---|---|
| ES | 8405475 | A1 * | 6/1984 | E05F 15/614 |
| FR | 2868112 | A1 * | 9/2005 | E05F 15/614 |
| IT | 202100012833 | A1 * | 11/2022 | E06B 11/02 |
| IT | 202200018444 | A1 * | 3/2024 | E05F 15/673 |
| NL | 2005402 | A * | 3/2011 | E05F 15/614 |

* cited by examiner

VEHICLE GATE MECHANICAL IMPROVEMENTS

CROSS-REFERENCE TO RELATED APPLICATIONS

This application claims benefit to U.S. provisional patent application No. 63/685,377 filed on 2024 Aug. 21.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

The present invention relates generally to automated gate systems. More particularly, it concerns a mechanical system for operating vehicle gates that is capable of bidirectional movement.

Automated gates are widely used in residential, commercial, and industrial environments to provide both security and controlled access. Conventional automated gate systems most often rely on linear actuators or swing-arm extension mechanisms to open and close gates. These designs are typically limited to unidirectional operation, which reduces their flexibility and adaptability in various installation settings.

A major limitation of such systems lies in their reliance on linear actuators that move the gate in a single, fixed direction—either opening or closing. This lack of versatility can create significant challenges when the swing direction of the gate must vary to accommodate the site. In addition, actuator-based systems generally require substantial clearance and physical space to operate properly, making them unsuitable for tighter or more confined installations. Their mechanical complexity can also lead to increased maintenance needs, as frequent use subjects components to wear and tear, raising both reliability concerns and operating costs.

Accordingly, there is a need for an improved automated gate system that overcomes these drawbacks by providing more versatile and reliable operation. An ideal solution would allow bidirectional movement, enabling the gate to open both inward and outward as conditions require. Such a system should also minimize the physical space needed for operation while reducing the mechanical strain on its components, thereby improving durability and lowering maintenance demands.

The present invention addresses these needs through a gear-based rotary system that allows a gate to rotate relative to its post in both directions. By eliminating the need for a linear actuator or swing arm, the system enhances the functional capabilities of automated gates while offering a compact, space-efficient design. This configuration makes the invention easier to integrate across a range of environments without the extensive clearance or mechanical accommodations demanded by prior art systems.

The present invention relates generally to the field of automated gate systems. More specifically, it pertains to a novel mechanical system for operating vehicle gates, which is capable of bidirectional movement.

Automated gates are a fundamental component in residential, commercial, and industrial environments, providing security and controlled access. Traditional automated gate systems primarily utilize linear actuators or arm extension mechanisms to open and close gates. These systems are typically designed for unidirectional operation, limiting their flexibility and functionality.

One common limitation of current technologies is the reliance on linear actuators, which move the gate in a single, fixed direction-either opening or closing. This restriction not only affects the efficiency of space utilization but also complicates installation in environments where gate swing direction must be versatile to accommodate specific site requirements.

Moreover, these conventional systems often require significant clearance and physical space to operate effectively, which can be impractical in tighter, more confined areas. The mechanical complexity and maintenance requirements of these systems add further challenges, as the mechanical wear and tear from frequent use can lead to reliability issues and increased operational costs.

There exists a need for an improved automated gate system that overcomes the drawbacks of the existing technologies by providing a more versatile and reliable operation. An ideal system would offer bidirectional movement capabilities, allowing the gate to open both inward and outward, thereby enhancing usability and installation flexibility. Such a system should also be designed to minimize the physical space required for operation and reduce the mechanical strain experienced by the components, leading to improved durability and reduced maintenance costs.

This invention addresses these needs by introducing a novel gear-based rotary system that permits the gate to rotate relative to its post in both directions. This system not only improves the functional capabilities of automated gates but also introduces a design that is easier to integrate into various settings without the extensive spatial or mechanical accommodations required by prior art.

No prior art is known to the Applicant.

BRIEF SUMMARY OF THE INVENTION

An automatic gate system 100 is disclosed. Comprising a support post 102 positioned near an entryway 108. A motor assembly 104 mounted to said support post 102. A gate rotating shaft 110 mechanically coupled to said motor assembly 104. A gate 106, operatively connected to said gate rotating shaft 110. Wherein said motor assembly 104 is configured to drive said gate rotating shaft 110, enabling said gate 106 to move bidirectionally between an open and a closed position relative to said entryway 108. A gear assembly 206 operatively connected to said motor assembly 104 and said gate rotating shaft 110. Wherein said gear assembly 206 is configured to translate the rotational power of said motor assembly 104 to said gate rotating shaft 110, thereby enabling the bidirectional movement of said gate 106. Said automatic gate system 100 is configured to rotate said gate 106 about said gate rotating shaft 110 between a closed configuration 900 with said gate 106 substantially blocking said entryway 108, and a first open configuration 902 and a second open configuration 904 with said gate 106 clear from said entryway 108 to allow traffic to pass through said automatic gate system 100. Said first open configuration 902 and said second open configuration 904 are in opposite directions from one another relative to said closed configuration 900. Accordingly, said automatic gate system 100 is configured to selectively rotate said gate 106 bidirectionally. Said motor assembly 104 and said gear assembly 206 are integrated into said gate rotating shaft 110 such that no external actuating arm or linear actuator is required to open or close the gate. Accordingly, said automatic gate system 100 is configured to operate within a limited spatial environment, with said gate rotating shaft 110 and said gear assembly 206 designed to minimize the physical space required for the bidirectional movement of said gate 106. A controller 114 configured to manage the operation of said gate 106. A remote control 116 operatively connected to said controller 114. Wherein said controller 114 is equipped with communication protocols enabling integration with existing security and home automation systems, thereby allowing said gate 106 to be controlled in synchronization with security alerts and access permissions.

A second embodiment of said automatic gate system 100 is disclosed wherein the support post 102 positioned near the entryway 108. The motor assembly 104 mounted to said support post 102. The gate rotating shaft 110 mechanically coupled to said motor assembly 104. The gate 106, operatively connected to said gate rotating shaft 110. Wherein said motor assembly 104 is configured to drive said gate rotating shaft 110, enabling said gate 106 to move bidirectionally between an open and a closed position relative to said entryway 108. The gear assembly 206 operatively connected to said motor assembly 104 and said gate rotating shaft 110. Wherein said gear assembly 206 is configured to translate the rotational power of said motor assembly 104 to said gate rotating shaft 110, thereby enabling the bidirectional movement of said gate 106. Said automatic gate system 100 is configured to rotate said gate 106 about said gate rotating shaft 110 between the closed configuration 900 with said gate 106 substantially blocking said entryway 108, and the first open configuration 902 and the second open configuration 904 with said gate 106 clear from said entryway 108 to allow traffic to pass through said automatic gate system 100. Said first open configuration 902 and said second open configuration 904 are in opposite directions from one another relative to said closed configuration 900. Accordingly, said automatic gate system 100 is configured to selectively rotate said gate 106 bidirectionally.

A third embodiment of said automatic gate system 100 is disclosed wherein the support post 102 positioned near the entryway 108. The motor assembly 104 mounted to said support post 102. The gate rotating shaft 110 mechanically coupled to said motor assembly 104. The gate 106, operatively connected to said gate rotating shaft 110. Wherein said motor assembly 104 is configured to drive said gate rotating shaft 110, enabling said gate 106 to move bidirectionally between an open and a closed position relative to said entryway 108. The gear assembly 206 operatively connected to said motor assembly 104 and said gate rotating shaft 110. Wherein said gear assembly 206 is configured to translate the rotational power of said motor assembly 104 to said gate rotating shaft 110, thereby enabling the bidirectional movement of said gate 106. Said automatic gate system 100 is configured to rotate said gate 106 about said gate rotating shaft 110 between the closed configuration 900 with said gate 106 substantially blocking said entryway 108, and the first open configuration 902 and the second open configuration 904 with said gate 106 clear from said entryway 108 to allow traffic to pass through said automatic gate system 100. Said first open configuration 902 and said second open configuration 904 are in opposite directions from one another relative to said closed configuration 900. Accordingly, said automatic gate system 100 is configured to selectively rotate said gate 106 bidirectionally. Said motor assembly 104 and said gear assembly 206 are integrated into said gate rotating shaft 110 such that no external actuating arm or linear actuator is required to open or close the gate. Accordingly, said automatic gate system 100 is configured to operate within a limited spatial environment, with said gate rotating shaft 110 and said gear assembly 206 designed to minimize the physical space required for the bidirectional movement of said gate 106. The controller 114 configured to manage the operation of said gate 106. The remote control 116 operatively connected to said controller 114. Wherein said controller 114 is equipped with communication protocols enabling integration with existing security and home automation systems, thereby allowing said gate 106 to be controlled in synchronization with security alerts and access permissions. The controller 114 configured to manage the operation of said gate 106. The remote control 116 operatively connected to said controller 114. Wherein said controller 114 is equipped with communication protocols enabling integration with existing security and home automation systems, thereby allowing said gate 106 to be controlled in synchronization with security alerts and access permissions.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
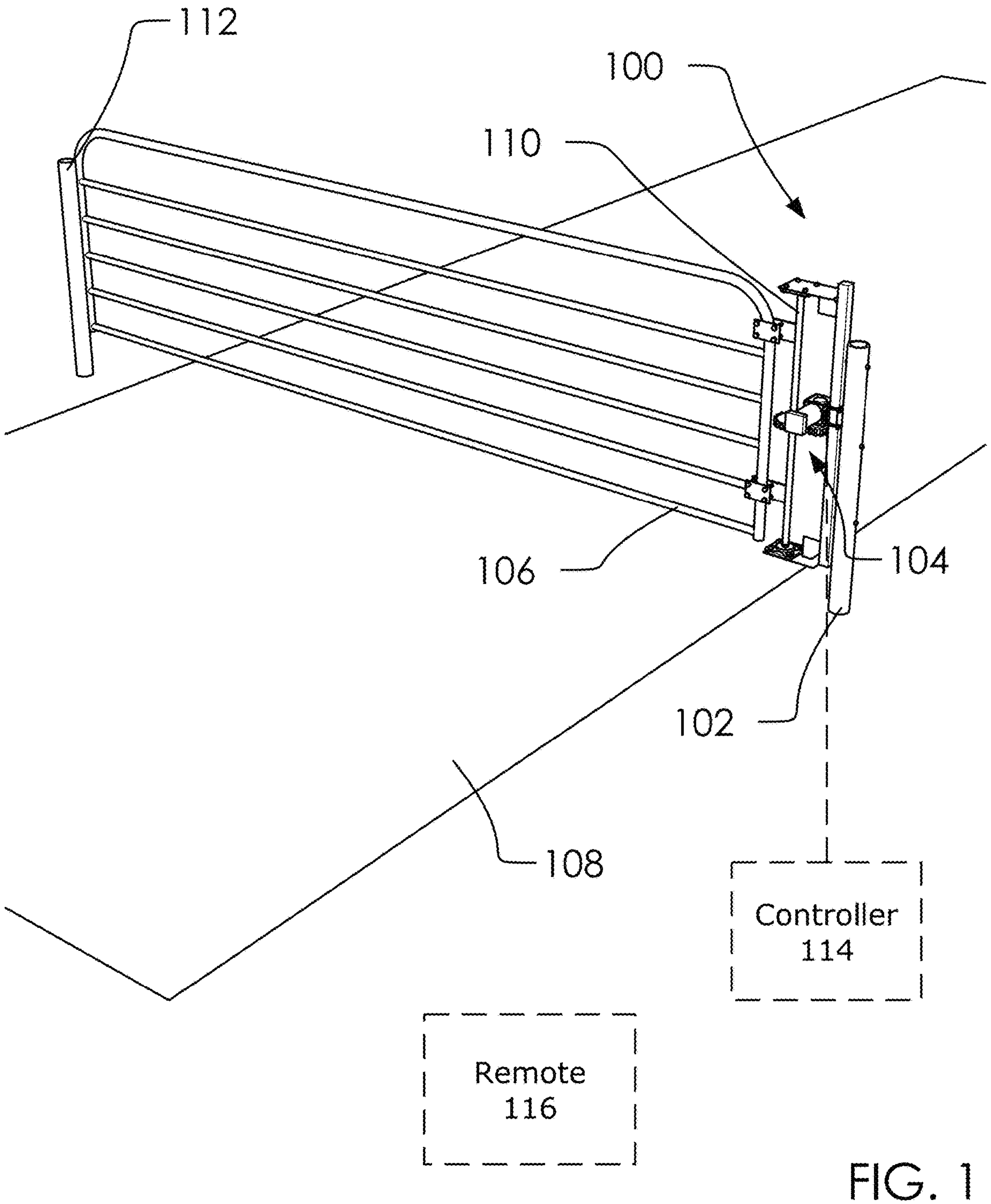
FIG. 1 illustrates a perspective overview of an automatic gate system 100.

FIG. 1 illustrates a perspective overview of an automatic gate system 100.

In one embodiment, automatic gate system 100 can be mounted to a support post 102 being in proximity to an entryway 108. automatic gate system 100 can comprise a motor assembly 104, and a gate rotating shaft 110. In one embodiment, motor assembly 104 can be mechanically coupled to gate rotating shaft 110 and can be configured to drive the rotational movement of a gate 106.

In one embodiment, gate 106 can move in a bidirectional using automatic gate system 100 to control its movement in a rotary motion as between a far-side post 112 and a parallel plane relative to entryway 108.

The automatic gate system 100 can be configured to provide controlled access along entryway 108.

In one embodiment, automatic gate system 100 can further comprise a controller 114 and a remote control 116. Wherein, controller 114 can control a position of gate 106 using motor assembly 104, as discussed below. Further, remote control 116 can be used to input signals to controller 114.

In terms of integration capabilities, automatic gate system 100 is engineered to seamlessly integrate with existing security and home automation systems. This integration is facilitated through controller 114, which is equipped with standardized communication protocols to interact with other security components, controller 114 ensures that the gate operation is synchronized with security alerts and access permissions defined by the overarching security system.

The remote control 116 can comprise the latest wireless technology to ensure a robust and secure connection to controller 114. This technology includes features such as rolling code encryption, which protects against the interception of signals by unauthorized entities. In one embodiment, remote control 116 can be compatible with various smart devices, offering users flexible control options for the gate system.

In one embodiment, said automatic gate system 100 is configured for operation within a limited spatial environment. Because all primary mechanical components—including said motor assembly 104, a gear assembly 206, and said gate rotating shaft 110—are mounted in close proximity to said support post 102, the system requires minimal lateral clearance. In contrast to traditional actuator arms, which extend outward and demand large swing areas, the present system's hinge-based rotation keeps movement confined to the immediate area around said support post 102. This compact arrangement allows the gate 106 to function effectively in narrow driveways, alleyways, or other installations where space is constrained, while still enabling full bidirectional operation.

Figure 2:
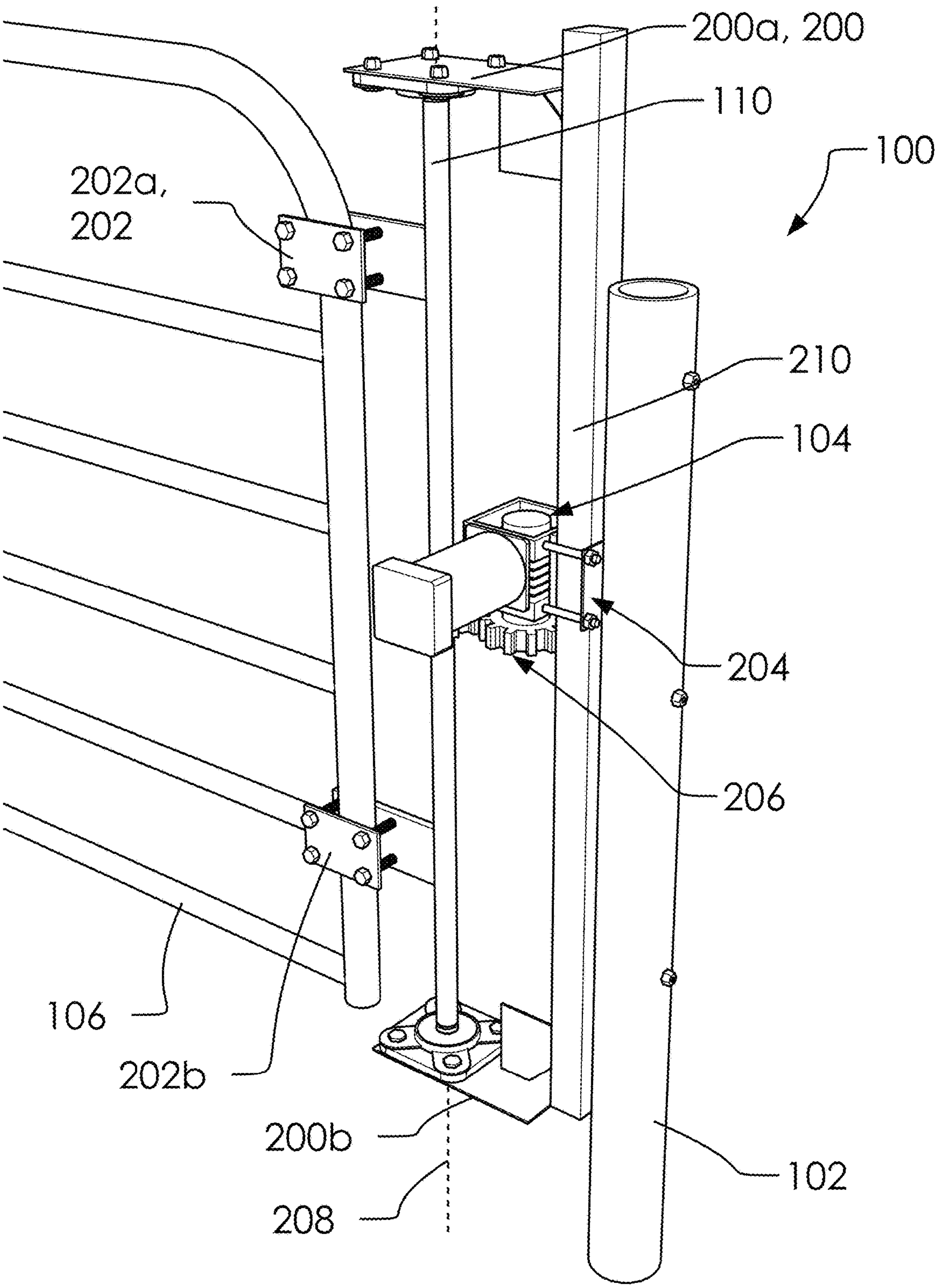
FIG. 2 illustrates a detailed perspective overview of automatic gate system 100.

FIG. 2 illustrates a detailed perspective overview of automatic gate system 100.

The automatic gate system 100 can comprise one or more gate shaft mounting assemblies 200 which comprise an upper gate shaft mounting assembly 200*a* and a lower gate shaft mounting assembly 200*b*; one or more fence brackets 202 which can comprise a first fence bracket 202*a* and a second fence bracket 202*b*; a motor mounting bracket 204; and the gear assembly 206.

The one or more gate shaft mounting assemblies 200 are configured to secure gate rotating shaft 110 in place, allowing for stable operation. These assemblies can work together to maintain the alignment and smooth movement of gate 106

Additionally, one or more fence brackets 202 can be configured to provide structural support, helping to integrate gate 106 seamlessly into its surrounding environment and alignment of gate rotating shaft 110 along a rotating axis 208.

The motor mounting bracket 204 is shown supporting motor assembly 104, anchoring it securely to support post 102 or an extension support pole 210. This bracket is configured to hold the motor in position, ensuring that it effectively drives the rotational movement of gate 106.

Finally, gear assembly 206 is depicted as being configured to translate the motor's power into the precise movement needed to rotate gate 106. The interaction between gear assembly 206 and gate rotating shaft 110 allows for smooth, bidirectional movement of the gate.

As illustrated, automatic gate system 100 further comprises extension support pole 210 attached to support post 102 and substantially vertical. In one embodiment, automatic gate system 100 can be attached directly to support post 102 without use of extension support pole 210. However, in one embodiment, extension support pole 210 can be attached to extend a height of automatic gate system 100 beyond the height of support post 102.

As discussed herein, unlike traditional gate openers, which use an external arm to force the gate open, said motor assembly 104 and said gear assembly 206 reside at the hinge and can rotate the gate rotating shaft 110 directly. This eliminates the need for any linear actuating arm.

In another embodiment, the gear assembly 206 may be replaced or supplemented by an equivalent transmission mechanism, such as a chain-drive or belt-drive system, to transmit power from the motor to the gate shaft. These alternatives similarly provide rotational drive at the hinge without an actuating arm.

Figure 3:
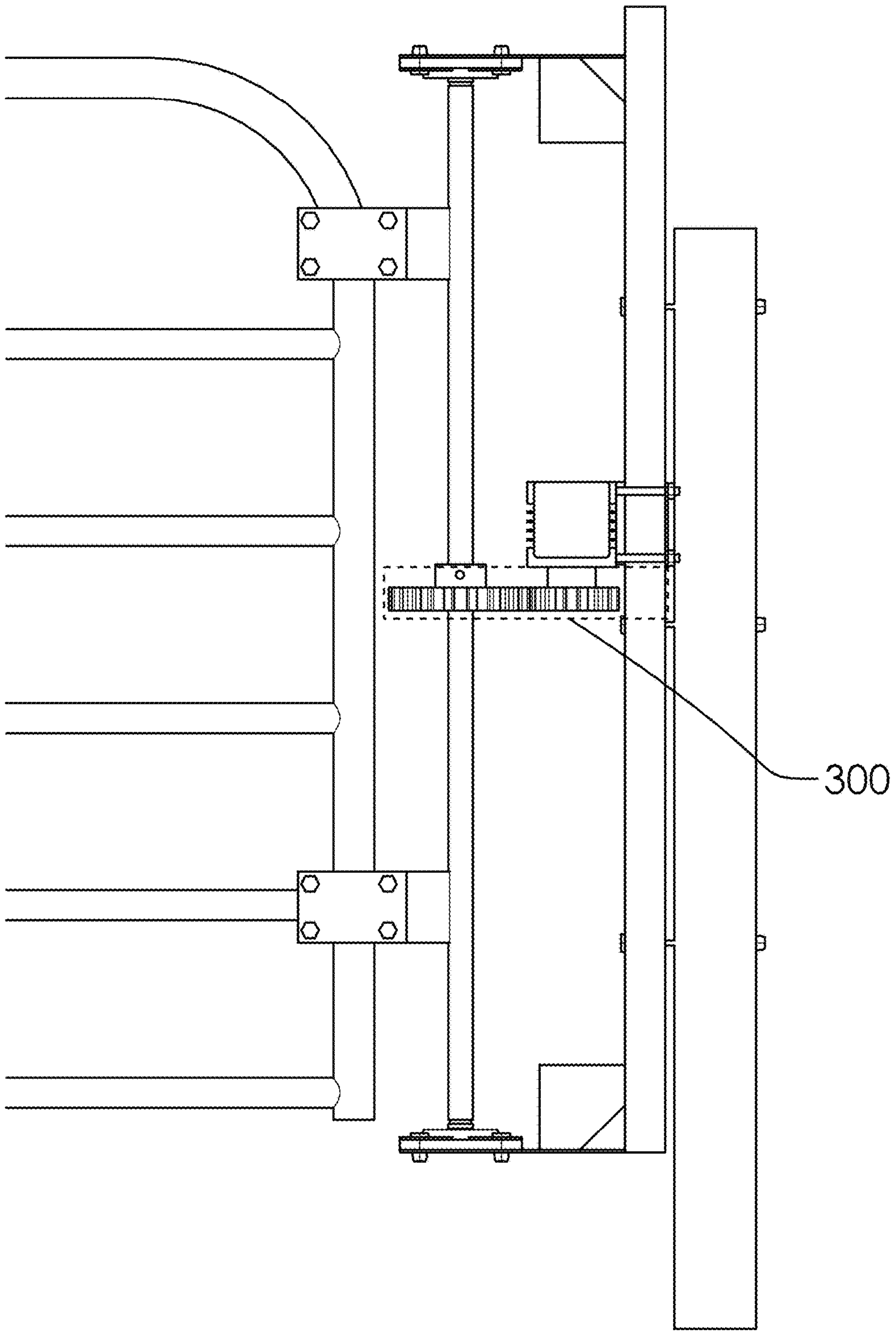
FIG. 3 illustrates an elevated front view of automatic gate system 100.

FIG. 3 illustrates an elevated front view of automatic gate system 100.

In one embodiment, said gear assembly 206 can be partially or fully enclosed within a protective enclosure 300 to protect the hardware and nearby users.

Figure 4:
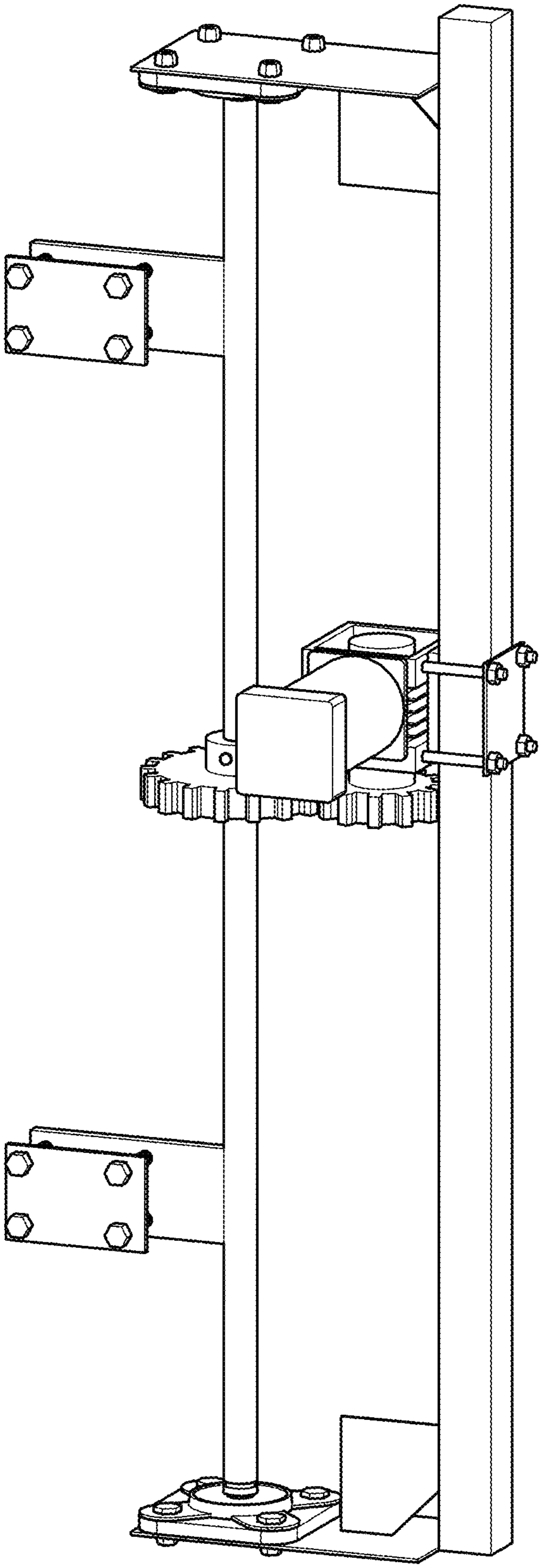
FIG. 4 illustrates a perspective overview of automatic gate system 100, showing automatic gate system 100 mounted to support post 102.

FIG. 4 illustrates a perspective overview of automatic gate system 100, showing automatic gate system 100 mounted to support post 102.

In one embodiment, one or more gate shaft mounting assemblies 200 can comprise an upper and a lower bearing assembly on the support post (or an extension thereof) to ensure stable bidirectional rotation of the gate.

Figure 5A:
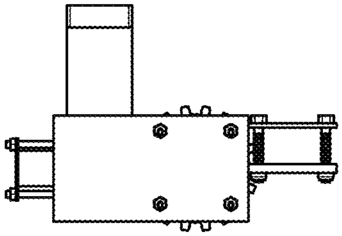
FIGS. 5A and 5B illustrate an elevated top view and an elevated front view of automatic gate system 100 without support post 102.
Figure 5B:
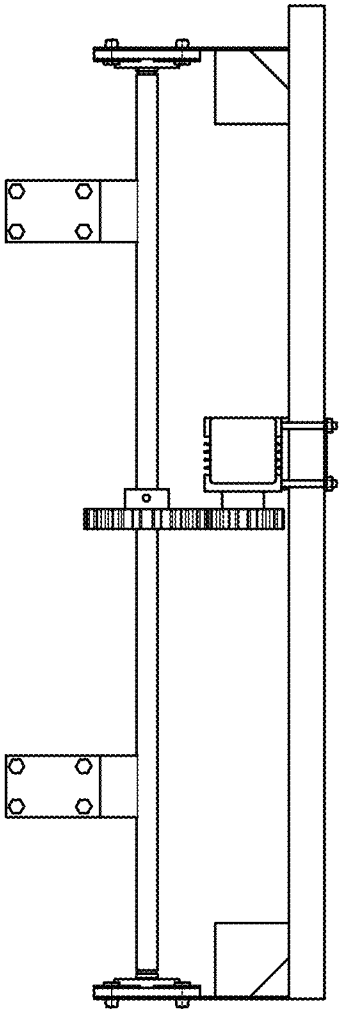

FIGS. 5A and 5B illustrate an elevated top view and an elevated front view of automatic gate system 100 without support post 102.

Figure 6A:
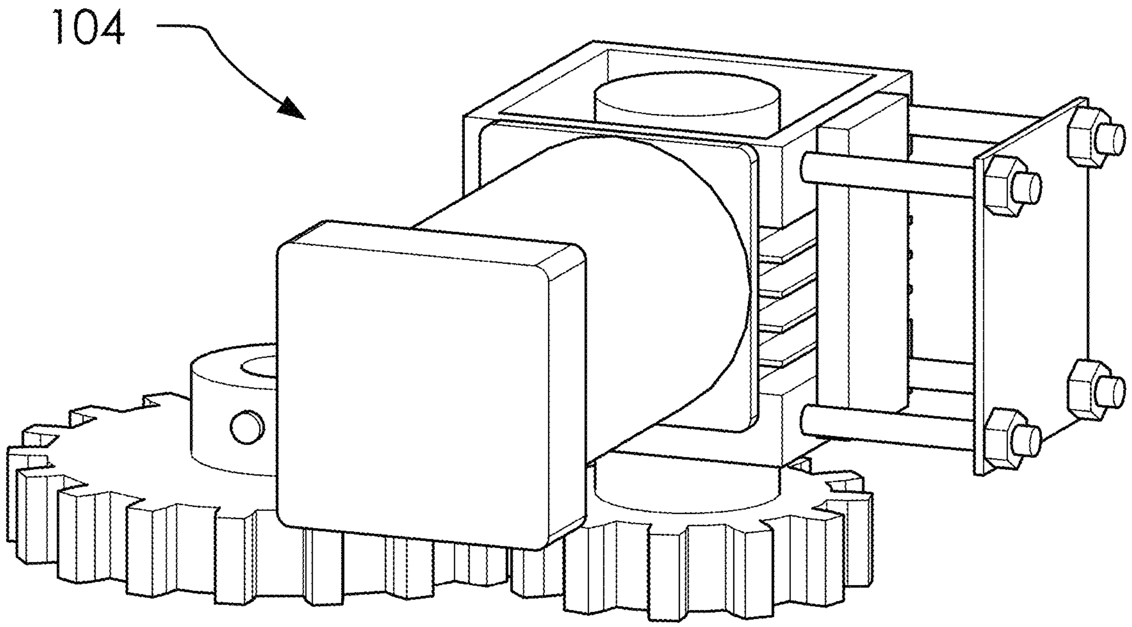
FIGS. 6A and 6B illustrate two perspective overviews of motor assembly 104.
Figure 6B:
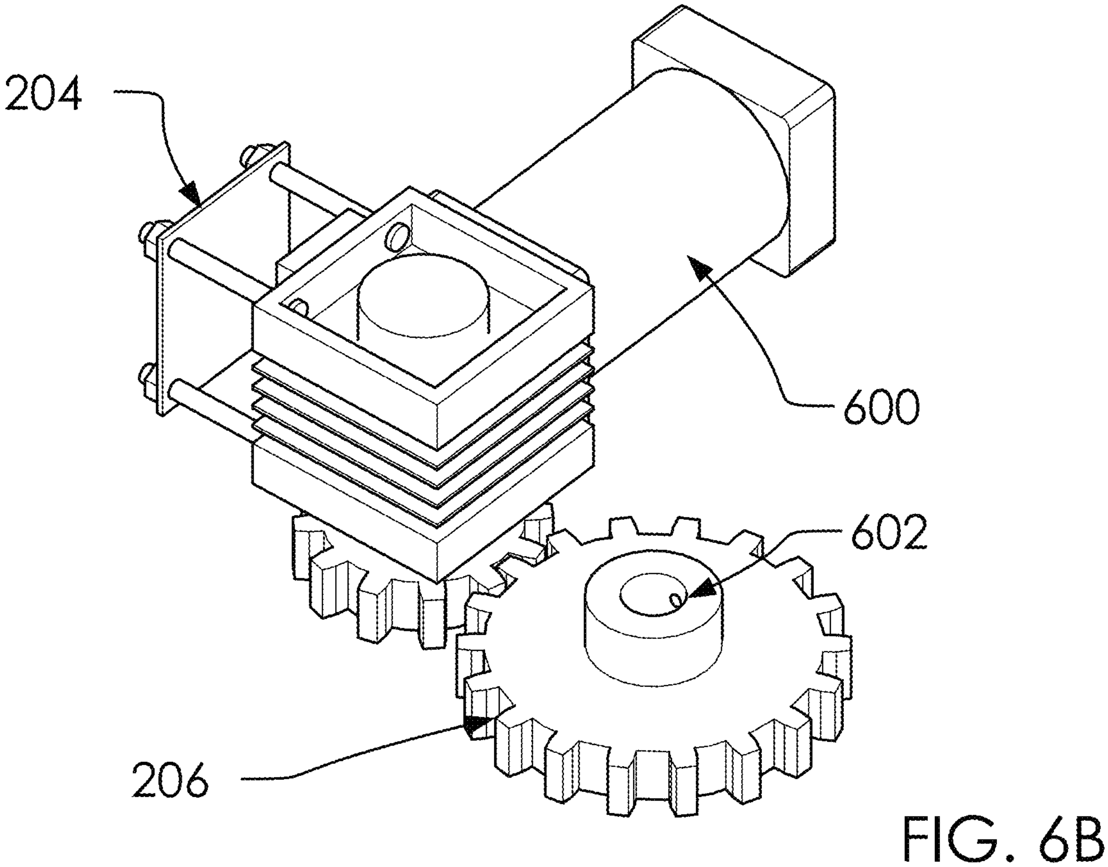

FIGS. 6A and 6B illustrate two perspective overviews of motor assembly 104.

In one embodiment, motor assembly 104 can comprise a motor 600 and an shaft guide slot 602.

First, FIG. 6A provides a detailed view of the interaction between motor 600 and gear assembly 206 within automatic gate system 100. In one embodiment, motor 600 is configured to drive gear assembly 206, which, in turn, facilitates the rotational movement of gate rotating shaft 110 and gate 106.

The figure also illustrates how motor 600 is securely mounted using motor mounting bracket 204, ensuring stable operation during the bidirectional movement of gate 106.

Next, FIG. 6B offers a complementary view, focusing on shaft guide slot 602, which is designed to accommodate gate rotating shaft 110. This slot ensures that the shaft remains properly aligned as it rotates, allowing for smooth and controlled movement of gate 106. The interaction between shaft guide slot 602 and gear assembly 206 is configured to maintain the integrity of the gate's motion, ensuring that the system operates efficiently.

While said motor 600 is depicted as an electric motor in the preferred embodiment, other types of rotary actuators may also be employed within said motor assembly 104. For example, said motor 600 may comprise a hydraulic rotary actuator, a pneumatic rotary actuator, or another form of power unit capable of imparting torque to said gear assembly 206 or directly to said gate rotating shaft 110. These variations similarly provide the hinge-based bidirectional motion of said gate 106 without the use of an external actuator arm, and are considered within the scope of the present invention.

Figure 7:
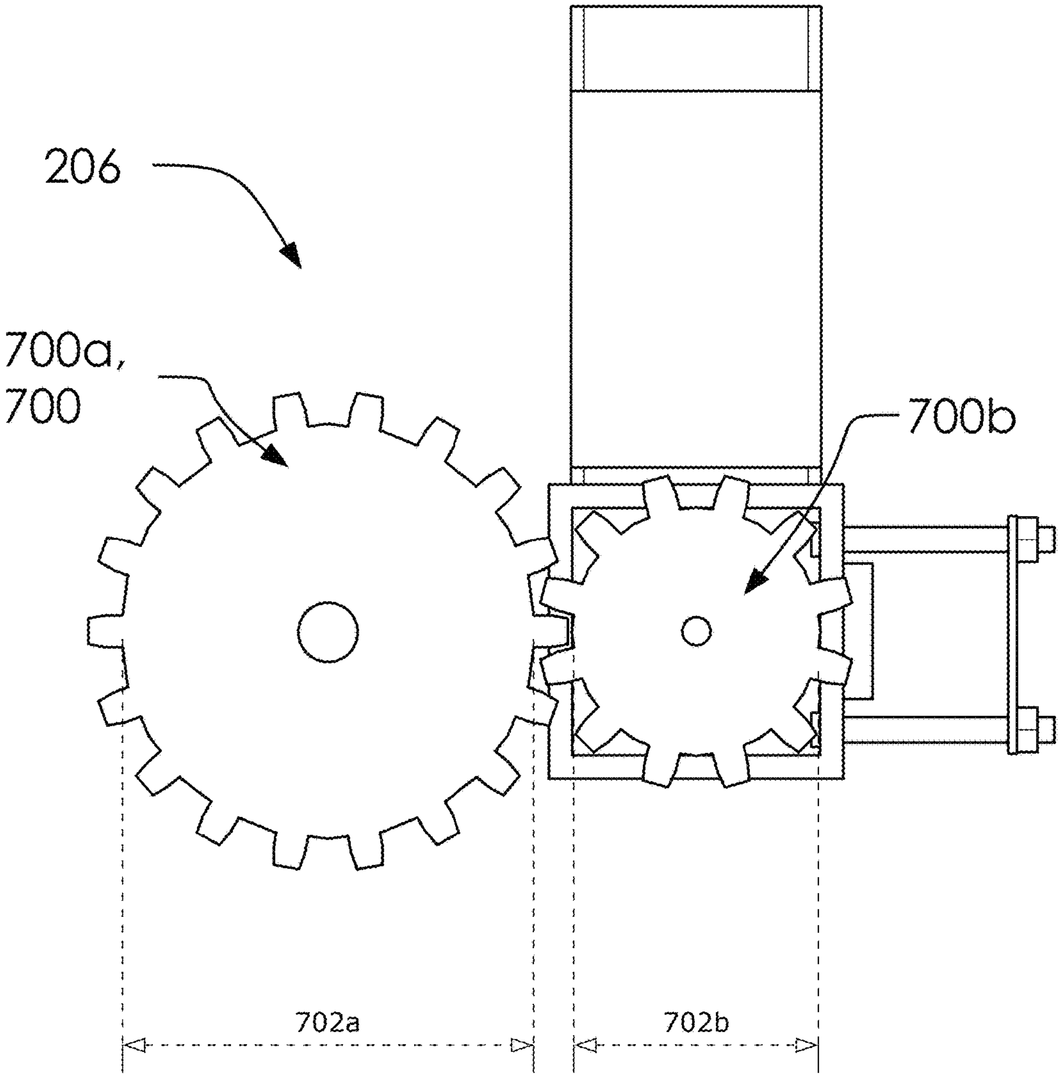
FIG. 7 illustrates an elevated bottom side view of motor assembly 104.

FIG. 7 illustrates an elevated bottom side view of motor assembly 104.

The gear assembly 206 can comprise two or more gears 700, comprising a first gear 700*a* and a second gear 700*b* having a first gear diameter 702*a* and a second gear diameter 702*b*, respectively.

In one embodiment, gear assembly 206 can be configured to engage with two or more gears 700 to achieve a specific gear ratio that governs the movement of gate 106.

The gear ratio between two or more gears 700 are configured for determining the rotational speed and torque transmitted through the system. The gear ratio is calculated by comparing the number of teeth or the diameter of two or more gears 700.

In one embodiment, first gear diameter 702*a* may be larger than second gear diameter 702*b*, resulting in different rotational speeds for first gear 700*a* and second gear 700*b* when driven by gear assembly 206. This differential in gear diameters allows the system to fine-tune the movement of gate 106, managing the balance between speed and torque to ensure smooth and controlled operation.

For example, if first gear 700*a* has a larger number of teeth relative to second gear 700*b*, the rotational speed of second gear 700*b* will be higher, but the torque will be lower. This configuration allows automatic gate system 100 to adjust the gate's movement characteristics based on the specific requirements of the installation, such as the gate's weight or the need for precision in positioning.

The gear ratio calculations, therefore, provide a method for optimizing the performance of automatic gate system 100, ensuring that the gate moves efficiently and reliably under various operational conditions.

Figure 8:
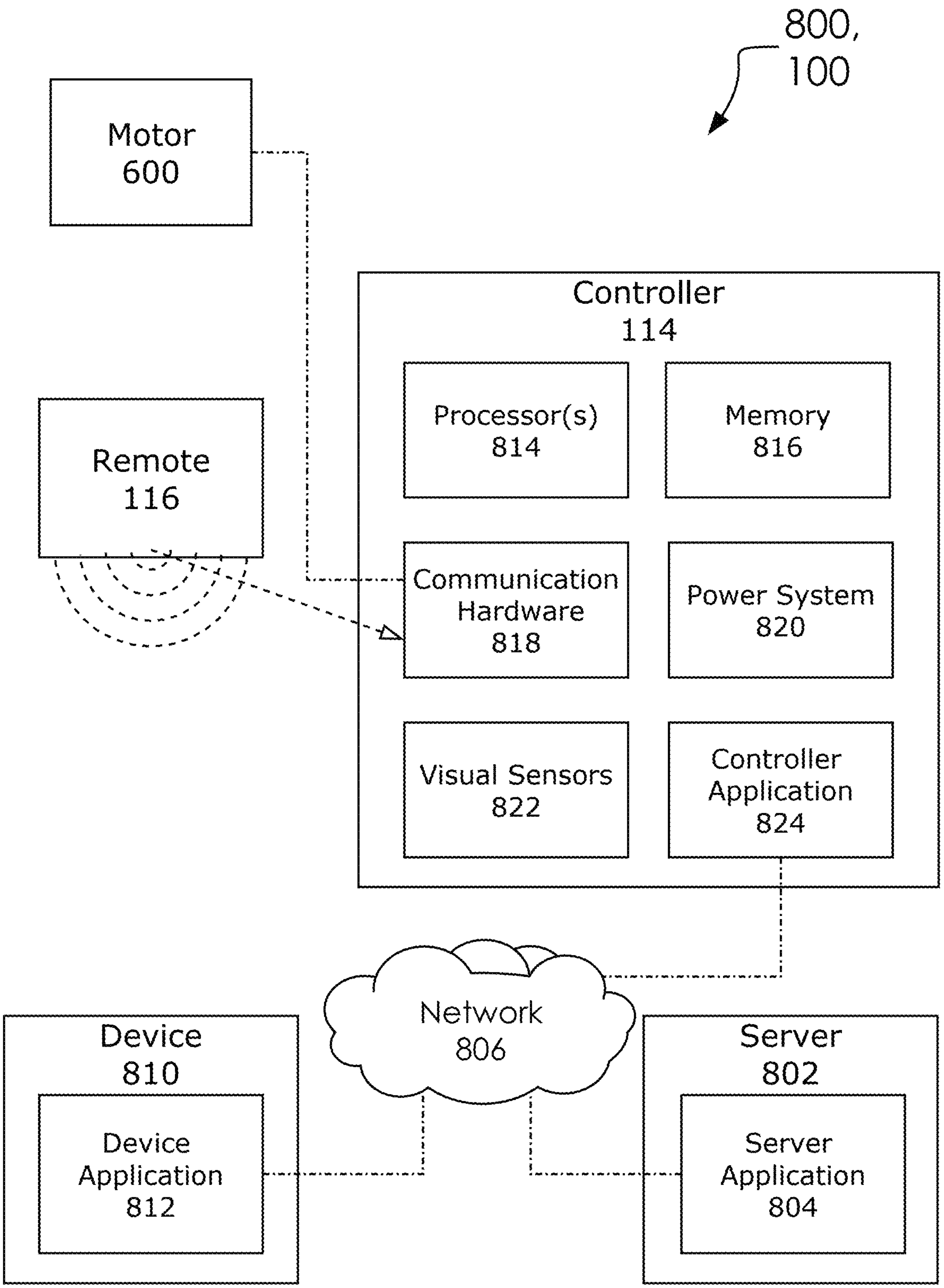
FIG. 8 illustrates a block diagram 800 of said automatic gate system 100.

FIG. 8 illustrates a block diagram 800 of said automatic gate system 100.

As illustrated, automatic gate system 100 can comprise a server 802 having a server application 804, a network 806, remote control 116 comprising an RF remote configured to create an RF signal 808, and an user device 810 having a device application 812.

In one embodiment, said controller 114 can comprise one or more processors 814, a memory 816, a communication hardware 818, a power system 820, one or more visual sensors 822, and a controller application 824.

The server 802 can communicate with user device 810 through network 806. user device 810 can execute device application 812 to interface with server application 804 running on server 802. This interaction facilitates the remote monitoring and control of automatic gate system 100.

The controller 114 manages the operations of automatic gate system 100, processing inputs from remote control 116. The communication hardware 818 and executing instructions stored in memory 816. The system can operate autonomously or be controlled manually. The RF signal 808 generated by remote control 116.

The power system 820 provides the necessary electrical power to the various components of controller 114, ensuring stable and continuous operation. Additionally, one or more visual sensors 822 are configured to capture visual data around the gate, which can be processed by controller application 824 to enhance the security and operational efficiency of the system.

The integration of controller 114 with server 802 and user device 810. The network 806 allows for advanced control features, including remote access, monitoring, and real-time updates, ensuring that automatic gate system 100 is both versatile and responsive to user inputs.

In one embodiment, a user may press a button on the remote control 116 to send the RF signal 808 to the controller 114, which then activates the motor 600 to rotate the gate 106 open. Said one or more visual sensors 822 may provide feedback or detect obstacles, allowing the controller to stop or reverse the gate if needed. The controller can also receive commands through the network 806 (for example, from a smartphone app or linked security system) to open or close the gate.

In operation, a user can press a button on remote control 116 or use a smartphone app to send a command. The network 806 to controller 114. Upon receiving an 'open' command, the controller verifies any security permissions and then powers the motor 600 to rotate the gate rotating shaft 110, thereby opening the gate 106. The gate can swing inward or outward depending on configuration or command. The controller may automatically stop the motor when a limit is reached (using limit switches or current sensors) to position the gate fully open. Subsequently, when a 'close' command is issued (or a timer elapses), the motor rotates the shaft in the opposite direction to close the gate. During closing, if the one or more visual sensors 822 or other safety sensor detects an obstacle, the controller can halt or reverse the gate to prevent an accident.

In operation, said controller 114 is configured to receive user input commands through said remote control 116, through said user device 810 executing said device application 812, or through said server 802 communicating via said network 806. For example, a user may actuate said remote control 116 to generate said RF signal 808, which is received by said communication hardware 818. Said controller 114 processes the signal with said one or more processors 814 and, in response, directs said motor assembly 104 to rotate said gate rotating shaft 110, thereby moving said gate 106 from a closed position to an open position.

Said controller 114 may also be programmed with logic to automatically close said gate 106 after a predetermined interval, or to prevent closing if said one or more visual sensors 822 detect an obstruction. In such embodiments, said one or more visual sensors 822 transmit data to said controller 114, which is analyzed by said controller application 824 to determine whether conditions are safe for movement. If an obstruction is present, said controller 114 may halt or reverse said motor assembly 104 to avoid collision.

Furthermore, said system may integrate with existing security or automation systems. For example, if an access permission is validated by said server application 804, said controller 114 may initiate an open command automatically.

Likewise, in the event of a security alert or emergency, said controller 114 can synchronize the state of said gate 106—either locking it closed or opening it to permit egress—based on the external signal received. This integration enables real-time, logic-based control of the gate system, ensuring safe, automated, and user-friendly operation.

In some embodiments, said controller application 824 may be further configured with a timer system for managing automatic closure of said gate 106. For example, after the gate is opened, said controller application 824 may initiate a countdown, and upon expiration of a preset interval, transmit a signal to said motor assembly 104 to rotate said gate rotating shaft 110 and return the gate 106 to a closed position unless otherwise interrupted.

In additional embodiments, said controller application 824 may employ a visual recognition algorithm in conjunction with said one or more visual sensors 822. This algorithm may be configured to interpret visual data and distinguish between various objects such as animals, vehicles, children, or other obstructions. Said controller application 824 may thereby prevent or delay closure of said gate 106 when an obstruction is detected in the path of movement. In further embodiments, said controller application 824 may also be programmed to recognize known versus unknown vehicles, enabling selective access control based on vehicle identity.

In one embodiment, said controller application 824 and said server application 804 may implement encryption protocols for internal and external communications. Such encryption systems ensure secure transmission of gate control commands, sensor data, and access permissions between said controller 114, said user device 810, and said server 802.

In another embodiment, said controller application 824 may be configured to generate visual records or event logs and upload such records to a cloud-based storage system. These records may include time-stamped images or video of gate operations and may be forwarded to interested parties, such as property owners or security services, via said server application 804.

Furthermore, said controller application 824 may include software modules for integration with external security or automation systems. In this manner, gate operations can be synchronized with broader security protocols-such as automatically unlocking the gate upon an authorized access event, or automatically locking and recording an event in response to a security breach signal.

Figure 9:
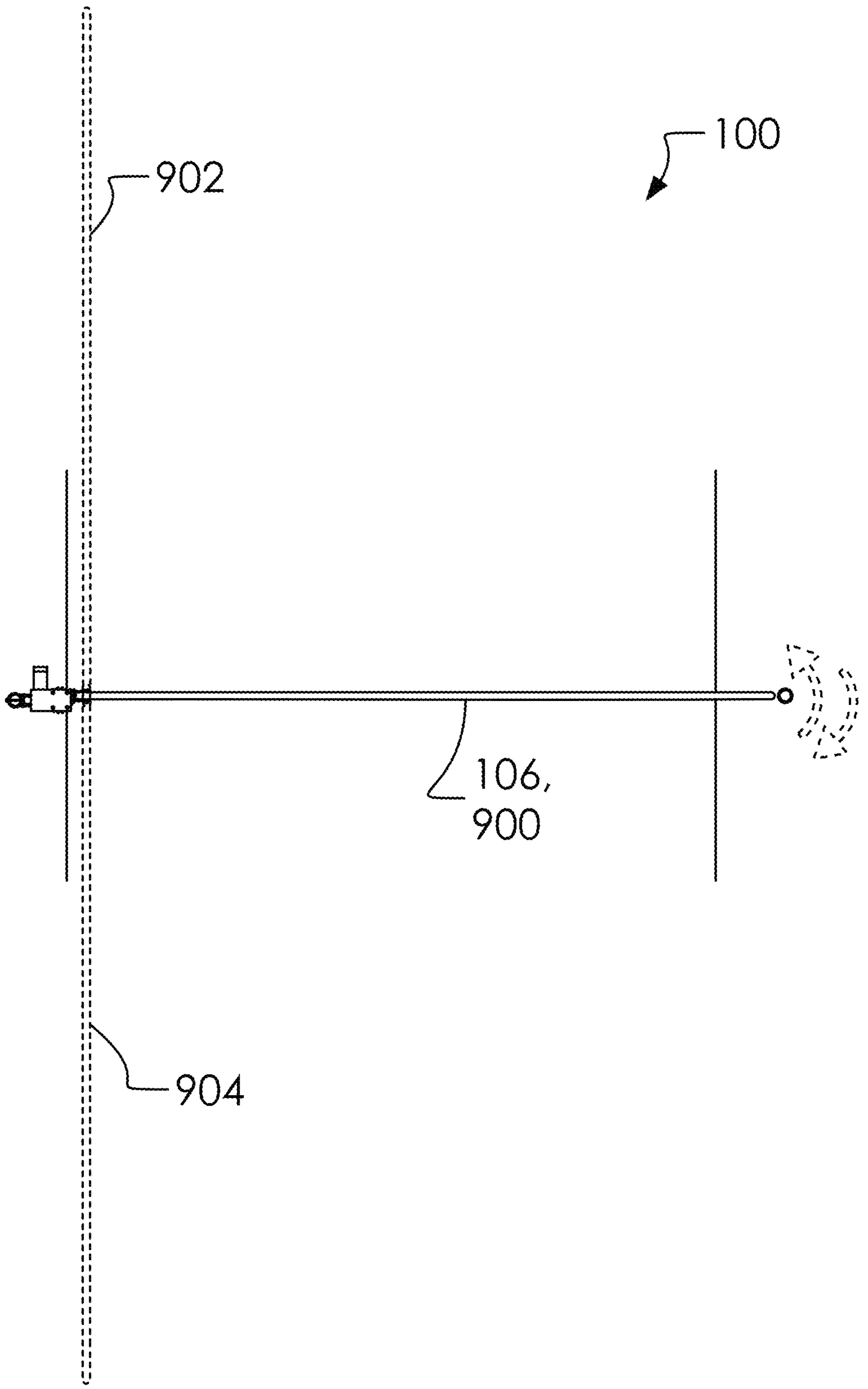
FIG. 9 illustrates an elevated top view of said automatic gate system 100 with said gate 106 in a closed configuration 900, a first open configuration 902 and a second open configuration 904.

FIG. 9 illustrates an elevated top view of said automatic gate system 100 with said gate 106 in a closed configuration 900, a first open configuration 902 and a second open configuration 904.

Unlike traditional hinges that open in a single direction, the gate rotating shaft 110 in the present system is not physically limited to one side. The gate 106 can thus swing to either side of the closed position. For instance, if installed on a driveway, the gate could open inward (onto the property) or outward (toward the street) as commanded. This bidirectional capability is achieved solely through the motor-driven hinge mechanism, without any additional hardware changes

PARTS LIST the automatic gate system 100,
the support post 102,
the motor assembly 104,
the gate 106,
the entryway 108,
the gate rotating shaft 110,
the far-side post 112,
the controller 114,
the remote control 116,
the upper gate shaft mounting assembly 200*a*,
the lower gate shaft mounting assembly 200*b*,
the one or more gate shaft mounting assemblies 200,
the first fence bracket 202*a*,
the second fence bracket 202*b*,
the one or more fence brackets 202,
the motor mounting bracket 204,
the gear assembly 206,
the rotating axis 208,
the extension support pole 210,
the protective enclosure 300,
the motor 600,
the shaft guide slot 602,
the second gear 700*b*,
the first gear 700*a*,
the two or more gears 700,
the second gear diameter 702*b*,
the first gear diameter 702*a*,
the block diagram 800,
the server 802,
the server application 804,
the network 806,
the RF signal 808,
the user device 810,
the device application 812,
the one or more processors 814,
the memory 816,
the communication hardware 818,
the power system 820,
the one or more visual sensors 822,
the controller application 824,
the closed configuration 900,
the first open configuration 902, and
the second open configuration 904.

The following is one preferred embodiment as presented in the original claims.

The automatic gate system 100 can comprise the support post 102 positioned near the entryway 108. The motor assembly 104 mounted to said support post 102. The gate rotating shaft 110 mechanically coupled to said motor assembly 104. The gate 106, operatively connected to said gate rotating shaft 110. Wherein said motor assembly 104 can be configured to drive said gate rotating shaft 110, enabling said gate 106 to move bidirectionally between an open and a closed position relative to said entryway 108. The gear assembly 206 operatively connected to said motor assembly 104 and said gate rotating shaft 110. Wherein said gear assembly 206 can be configured to translate the rotational power of said motor assembly 104 to said gate rotating shaft 110, thereby enabling the bidirectional movement of said gate 106. Said automatic gate system 100 can be configured to rotate said gate 106 about said gate rotating shaft 110 between the closed configuration 900 with said gate 106 substantially blocking said entryway 108, and the first open configuration 902 and the second open configuration 904 with said gate 106 clear from said entryway 108 to allow traffic to pass through said automatic gate system 100. Said first open configuration 902 and said second open configuration 904 can be in opposite directions from one another relative to said closed configuration 900. Accordingly, said automatic gate system 100 can be configured to selectively rotate said gate 106 bidirectionally. Said motor assembly 104 and said gear assembly 206 can be integrated into said gate rotating shaft 110 such that no external actuating arm or linear actuator can be required to open or close the gate. Accordingly, said automatic gate system 100 can be configured to operate within a limited spatial environment, with said gate rotating shaft 110 and said gear assembly 206 designed to minimize the physical space required for the bidirectional movement of said gate 106. The controller 114 configured to manage the operation of said gate 106. The remote control 116 operatively connected to said controller 114. Wherein said controller 114 can be equipped with communication protocols enabling integration with existing security and home automation systems, thereby allowing said gate 106 to be controlled in synchronization with security alerts and access permissions.

The automatic gate system 100 can comprise the support post 102 positioned near the entryway 108. The motor assembly 104 mounted to said support post 102. The gate rotating shaft 110 mechanically coupled to said motor assembly 104. The gate 106, operatively connected to said gate rotating shaft 110. Wherein said motor assembly 104 can be configured to drive said gate rotating shaft 110, enabling said gate 106 to move bidirectionally between an open and a closed position relative to said entryway 108. The gear assembly 206 operatively connected to said motor assembly 104 and said gate rotating shaft 110. Wherein said gear assembly 206 can be configured to translate the rotational power of said motor assembly 104 to said gate rotating shaft 110, thereby enabling the bidirectional movement of said gate 106. Said automatic gate system 100 can be configured to rotate said gate 106 about said gate rotating shaft 110 between the closed configuration 900 with said gate 106 substantially blocking said entryway 108, and the first open configuration 902 and the second open configuration 904 with said gate 106 clear from said entryway 108 to allow traffic to pass through said automatic gate system 100. Said first open configuration 902 and said second open configuration 904 can be in opposite directions from one another relative to said closed configuration 900. Accordingly, said automatic gate system 100 can be configured to selectively rotate said gate 106 bidirectionally.

Said motor assembly 104 and said gear assembly 206 can be integrated into said gate rotating shaft 110 such that no external actuating arm or linear actuator can be required to open or close the gate. Accordingly, said automatic gate system 100 can be configured to operate within a limited spatial environment, with said gate rotating shaft 110 and said gear assembly 206 designed to minimize the physical space required for the bidirectional movement of said gate 106.

The controller 114 configured to manage the operation of said gate 106. The remote control 116 operatively connected to said controller 114. Wherein said controller 114 can be equipped with communication protocols enabling integration with existing security and home automation systems, thereby allowing said gate 106 to be controlled in synchronization with security alerts and access permissions.

Said one or more visual sensors 822 operatively connected to said controller 114, wherein said controller 114 can be configured to modify or halt the movement of said gate 106 based on data provided by said one or more visual sensors 822.

Said one or more visual sensors 822 can be configured to capture images of vehicles approaching said gate 106. Said controller 114 communicatively coupled to said one or more visual sensors 822. Wherein said controller 114 can be configured to compare the captured images to stored identification data to distinguish known vehicles from unknown vehicles and to control operation of said gate said gate 106 based on that determination.

The communication hardware 818 configured to connect said automatic gate system 100 to the server 802 via the network 806. The user device 810 running the device application 812. Wherein said user device 810 communicates with said server 802 to allow remote monitoring and control of said automatic gate system 100.

Said gear assembly 206 comprises two or more gears 700, comprising the first gear **700*a* and the second gear 700*b* having the first gear diameter 702*a* and the second gear diameter 702*b*, respectively. Said gear assembly 206 can be configured to engage with said two or more gears 700 to achieve a specific gear ratio that governs the movement of said gate 106**.

Said first gear diameter **702*a* may be larger than said second gear diameter 702*b*, resulting in different rotational speeds for said first gear 700*a* and said second gear 700*b* when driven by said gear assembly 206. This differential in gear diameters allows the system to fine-tune the movement of said gate 106**, managing the balance between speed and torque to ensure smooth and controlled operation.

Said first gear **700*a* can be aligned with said gate rotating shaft 110. Said second gear 700*b* can be aligned with an output shaft of said 600/. Said first gear 700*a* applies power to said gate rotating shaft 110 to control the position of said gate 106 relative to said entryway 108. Thereby, said gear assembly 206 can be configured to control said gate 106 without a separate external gear train Said second gear 700*b* having said second gear diameter 702*b* different from said first diameter said first gear diameter 702*a*. And wherein said first gear 700*a* and said second gear 700*b* can be engaged with each other, such that the difference between said first gear diameter 702*a* and said second gear diameter 702*b* provides a gear ratio that balances rotational speed and torque to ensure smooth and controlled bidirectional movement of said gate 106**.

Said first gear **700*a* comprises the shaft guide slot 602 configured to accommodate said gate rotating shaft 110 and maintain said gate rotating shaft 110 in proper alignment during rotation, thereby ensuring smooth and controlled movement of said gate 106**.

The gate rotating shaft can be supported by an upper and a lower bearing assembly on the support post to ensure stable bidirectional rotation of said gate 106.

Said gear assembly 206 can be housed within the protective enclosure 300 attached to said support post 102. Said protective enclosure 300 can be configured to be weather-resistant and positioned such that the mechanical components do not protrude outward from the gate or post.

Said automatic gate system 100 further comprises the upper gate shaft mounting assembly **200*a*, and the lower gate shaft mounting assembly 200*b*. Wherein said upper gate shaft mounting assembly 200*a* and said lower gate shaft mounting assembly 200*b* can be configured to secure said gate rotating shaft 110 to said support post 102 to maintain alignment and stability of said gate 106** during its bidirectional movement.

Said automatic gate system 100 further comprises the first fence bracket **202*a*, and the second fence bracket 202*b*. Wherein said first fence bracket 202*a* and said second fence bracket 202*b* can be configured to provide structural support for said gate 106 and to maintain alignment of said gate rotating shaft 110 along the rotating axis 208 for smooth operation of said gate 106**.

The automatic gate system 100 can comprise the support post 102 positioned near the entryway 108. The motor assembly 104 mounted to said support post 102. The gate rotating shaft 110 mechanically coupled to said motor assembly 104. The gate 106, operatively connected to said gate rotating shaft 110. Wherein said motor assembly 104 can be configured to drive said gate rotating shaft 110, enabling said gate 106 to move bidirectionally between an open and a closed position relative to said entryway 108. The gear assembly 206 operatively connected to said motor assembly 104 and said gate rotating shaft 110. Wherein said gear assembly 206 can be configured to translate the rotational power of said motor assembly 104 to said gate rotating shaft 110, thereby enabling the bidirectional movement of said gate 106. Said automatic gate system 100 can be configured to rotate said gate 106 about said gate rotating shaft 110 between the closed configuration 900 with said gate 106 substantially blocking said entryway 108, and the first open configuration 902 and the second open configuration 904 with said gate 106 clear from said entryway 108 to allow traffic to pass through said automatic gate system 100. Said first open configuration 902 and said second open configuration 904 can be in opposite directions from one another relative to said closed configuration 900. Accordingly, said automatic gate system 100 can be configured to selectively rotate said gate 106 bidirectionally. Said motor assembly 104 and said gear assembly 206 can be integrated into said gate rotating shaft 110 such that no external actuating arm or linear actuator can be required to open or close the gate. Accordingly, said automatic gate system 100 can be configured to operate within a limited spatial environment, with said gate rotating shaft 110 and said gear assembly 206 designed to minimize the physical space required for the bidirectional movement of said gate 106. The controller 114 configured to manage the operation of said gate 106. The remote control 116 operatively connected to said controller 114. Wherein said controller 114 can be equipped with communication protocols enabling integration with existing security and home automation systems, thereby allowing said gate 106 to be controlled in synchronization with security alerts and access permissions. The controller 114 configured to manage the operation of said gate 106. The remote control 116 operatively connected to said controller 114. Wherein said controller 114 can be equipped with communication protocols enabling integration with existing security and home automation systems, thereby allowing said gate 106 to be controlled in synchronization with security alerts and access permissions.

Said one or more visual sensors 822 operatively connected to said controller 114, wherein said controller 114 can be configured to modify or halt the movement of said gate 106 based on data provided by said one or more visual sensors 822.

Said one or more visual sensors 822 can be configured to capture images of vehicles approaching said gate 106. Said controller 114 communicatively coupled to said one or more visual sensors 822. Wherein said controller 114 can be configured to compare the captured images to stored identification data to distinguish known vehicles from unknown vehicles and to control operation of said gate said gate 106 based on that determination.

The communication hardware 818 configured to connect said automatic gate system 100 to the server 802 via the network 806. The user device 810 running the device application 812. Wherein said user device 810 communicates with said server 802 to allow remote monitoring and control of said automatic gate system 100.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An automatic gate system comprising:

a support post positioned near an entryway;

a motor assembly mounted to said support post;

a gate rotating shaft mechanically coupled to said motor assembly;

a gate, operatively connected to said gate rotating shaft;

wherein said motor assembly is configured to drive said gate rotating shaft, enabling said gate to move bidirectionally between an open and a closed position relative to said entryway;

a gear assembly operatively connected to said motor assembly and said gate rotating shaft;

wherein said gear assembly is configured to translate the rotational power of said motor assembly to said gate rotating shaft, thereby enabling the bidirectional movement of said gate;

said automatic gate system is configured to rotate said gate about said gate rotating shaft between the closed configuration with said gate substantially blocking said entryway, and the first open configuration and a second open configuration with said gate clear from said entryway to allow traffic to pass through said automatic gate system;

said first open configuration and said second open configuration are in opposite directions from one another relative to said closed configuration;

accordingly, said automatic gate system is configured to selectively rotate said gate bidirectionally;

said motor assembly and said gear assembly are integrated into said gate rotating shaft such that no external actuating arm or linear actuator is required to open or close the gate;

accordingly, said automatic gate system is configured to operate within a limited spatial environment, with said gate rotating shaft and said gear assembly designed to minimize the physical space required for the bidirectional movement of said gate;

a controller configured to manage the operation of said gate;

a remote control operatively connected to said controller; and wherein said controller is equipped with communication protocols enabling integration with existing security and home automation systems, thereby allowing said gate to be controlled in synchronization with security alerts and access permissions.

2. An automatic gate system comprising:

a support post positioned near an entryway;

a motor assembly mounted to said support post;

a gate rotating shaft mechanically coupled to said motor assembly;

a gate, operatively connected to said gate rotating shaft;

wherein said motor assembly is configured to drive said gate rotating shaft, enabling said gate to move bidirectionally between an open and a closed position relative to said entryway;

a gear assembly operatively connected to said motor assembly and said gate rotating shaft;

wherein said gear assembly is configured to translate the rotational power of said motor assembly to said gate rotating shaft, thereby enabling the bidirectional movement of said gate;

said automatic gate system is configured to rotate said gate about said gate rotating shaft between the closed configuration with said gate substantially blocking said entryway, and the first open configuration and a second open configuration with said gate clear from said entryway to allow traffic to pass through said automatic gate system;

said first open configuration and said second open configuration are in opposite directions from one another relative to said closed configuration; and accordingly, said automatic gate system is configured to selectively rotate said gate bidirectionally.

3. The automatic gate system of claim 2, wherein said motor assembly and said gear assembly are integrated into said gate rotating shaft such that no external actuating arm or linear actuator is required to open or close the gate; and accordingly, said automatic gate system is configured to operate within a limited spatial environment, with said gate rotating shaft and said gear assembly designed to minimize the physical space required for the bidirectional movement of said gate.

4. The automatic gate system of claim 2, further comprising:

a controller configured to manage the operation of said gate;

a remote control operatively connected to said controller; and wherein said controller is equipped with communication protocols enabling integration with existing security and home automation systems, thereby allowing said gate to be controlled in synchronization with security alerts and access permissions.

5. The automatic gate system of claim 4, further comprising said one or more visual sensors operatively connected to said controller, wherein said controller is configured to modify or halt the movement of said gate based on data provided by said one or more visual sensors.

6. The automatic gate system of claim 4, further comprising said one or more visual sensors are configured to capture images of vehicles approaching said gate;

said controller communicatively coupled to said one or more visual sensors; and wherein said controller is configured to compare the captured images to stored identification data to distinguish known vehicles from unknown vehicles and to control operation of said gate said gate based on that determination.

7. The automatic gate system of claim 4, further comprising a communication hardware configured to connect said automatic gate system to a server via a network;

a user device running a device application; and wherein said user device communicates with said server to allow remote monitoring and control of said automatic gate system.

8. The automatic gate system of claim 2, wherein said gear assembly comprises two or more gears, comprising a first gear and a second gear having a first gear diameter and a second gear diameter, respectively; and said gear assembly is configured to engage with said two or more gears to achieve a specific gear ratio that governs the movement of said gate.

9. The automatic gate system of claim 8, wherein said first gear diameter may be larger than said second gear diameter, resulting in different rotational speeds for said first gear and said second gear when driven by said gear assembly; and this differential in gear diameters allows the system to fine-tune the movement of said gate, managing the balance between speed and torque to ensure smooth and controlled operation.

10. The automatic gate system of claim 8, wherein said first gear is aligned with said gate rotating shaft;

said second gear is aligned with an output shaft of said motor;

said first gear applies power to said gate rotating shaft to control the position of said gate relative to said entryway; and thereby, said gear assembly is configured to control said gate without a separate external gear train.

11. The automatic gate system of claim 8, wherein said second gear having said second gear diameter different from said first diameter said first gear diameter; and and wherein said first gear and said second gear are engaged with each other, such that the difference between said first gear diameter and said second gear diameter provides a gear ratio that balances rotational speed and torque to ensure smooth and controlled bidirectional movement of said gate.

12. The automatic gate system of claim 8, wherein said first gear comprises a shaft guide slot configured to accommodate said gate rotating shaft and maintain said gate rotating shaft in proper alignment during rotation, thereby ensuring smooth and controlled movement of said gate.

13. The automatic gate system of claim 2, wherein the gate rotating shaft is supported by an upper and a lower bearing assembly on the support post to ensure stable bidirectional rotation of said gate.

14. The automatic gate system of claim 2, wherein said gear assembly is housed within a protective enclosure attached to said support post; and said protective enclosure is configured to be weather-resistant and positioned such that the mechanical components do not protrude outward from the gate or post.

15. The automatic gate system of claim 2, wherein said automatic gate system further comprises an upper gate shaft mounting assembly, and a lower gate shaft mounting assembly; and wherein said upper gate shaft mounting assembly and said lower gate shaft mounting assembly are configured to secure said gate rotating shaft to said support post to maintain alignment and stability of said gate during its bidirectional movement.

16. The automatic gate system of claim 2, wherein said automatic gate system further comprises a first fence bracket, and a second fence bracket; and wherein said first fence bracket and said second fence bracket are configured to provide structural support for said gate and to maintain alignment of said gate rotating shaft along a rotating axis for smooth operation of said gate.

17. An automatic gate system comprising:

a support post positioned near an entryway;

a motor assembly mounted to said support post;

a gate rotating shaft mechanically coupled to said motor assembly;

a gate, operatively connected to said gate rotating shaft;

wherein said motor assembly is configured to drive said gate rotating shaft, enabling said gate to move bidirectionally between an open and a closed position relative to said entryway;

a gear assembly operatively connected to said motor assembly and said gate rotating shaft;

wherein said gear assembly is configured to translate the rotational power of said motor assembly to said gate rotating shaft, thereby enabling the bidirectional movement of said gate;

said automatic gate system is configured to rotate said gate about said gate rotating shaft between the closed configuration with said gate substantially blocking said entryway, and the first open configuration and a second open configuration with said gate clear from said entryway to allow traffic to pass through said automatic gate system;

said first open configuration and said second open configuration are in opposite directions from one another relative to said closed configuration;

accordingly, said automatic gate system is configured to selectively rotate said gate bidirectionally;

said motor assembly and said gear assembly are integrated into said gate rotating shaft such that no external actuating arm or linear actuator is required to open or close the gate;

accordingly, said automatic gate system is configured to operate within a limited spatial environment, with said gate rotating shaft and said gear assembly designed to minimize the physical space required for the bidirectional movement of said gate;

a controller configured to manage the operation of said gate;

a remote control operatively connected to said controller;

wherein said controller is equipped with communication protocols enabling integration with existing security and home automation systems, thereby allowing said gate to be controlled in synchronization with security alerts and access permissions;

the controller configured to manage the operation of said gate;

the remote control operatively connected to said controller; and wherein said controller is equipped with communication protocols enabling integration with existing security and home automation systems, thereby allowing said gate to be controlled in synchronization with security alerts and access permissions.

18. The automatic gate system of claim 17, further comprising said one or more visual sensors operatively connected to said controller, wherein said controller is configured to modify or halt the movement of said gate based on data provided by said one or more visual sensors.

19. The automatic gate system of claim 17, further comprising said one or more visual sensors are configured to capture images of vehicles approaching said gate;

said controller communicatively coupled to said one or more visual sensors; and wherein said controller is configured to compare the captured images to stored identification data to distinguish known vehicles from unknown vehicles and to control operation of said gate said gate based on that determination.

20. The automatic gate system of claim 17, further comprising a communication hardware configured to connect said automatic gate system to a server via a network;

a user device running a device application; and wherein said user device communicates with said server to allow remote monitoring and control of said automatic gate system.

* * * * *